TRANSISTOR DETECTOR

Filed Sept. 16, 1953

INVENTOR
H. M. STRAUBE
BY N. S. Ewing
ATTORNEY

United States Patent Office 2,864,002

Patented Dec. 9, 1958

2,864,002

TRANSISTOR DETECTOR

Harold M. Straube, Mendham, N. J., assignor to Bell Telephone Laboratories, Incorporated, New York, N. Y., a corporation of New York Application September 16, 1953, Serial No. 380,554

1 Claim. (Cl. 250—31)

This invention relates to the detection of modulated signal waves.

An object of the invention is a highly efficient, sensitive, and linear detector.

Another object of the invention is an improved transistor detector.

As an illustrative embodiment of the invention, there is described in more detail below a transistor detector suitable, for example, for use in miniature radio equipment. This detector embodies the more obvious advantages attained by employing transistors, i. e., small size and low power drain. However, by employing principles of the invention, even greater advantages are obtained over such detectors as might be suggested, for example, by the known transistor-vacuum tube principle of analogy which relates the base electrode of a transistor to the control grid of a vacuum tube, the emitter electrode to the cathode, and the collector electrode to the anode.

In one embodiment of the invention, modulated signals to be detected are applied to the transistor in grounded base configuration. High sensitivity and efficiency are obtained by connecting in series with the base electrode a resistor proportioned to reduce, by regenerative feedback, the input resistance $R_{11}$ to a very small value either positive or negative. An input characteristic approximating that of an ideal rectifier is thereby obtained. The detected modulation signals may be derived either by filtering the collector current or from across a by-passed resistor connected in series with the input circuit. Due to the sharp break in the current-voltage characteristic, very weak signals may be detected without preamplification.

Figure 1:
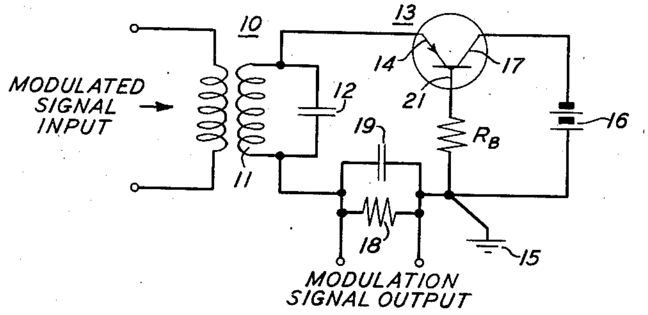
Figure 2:
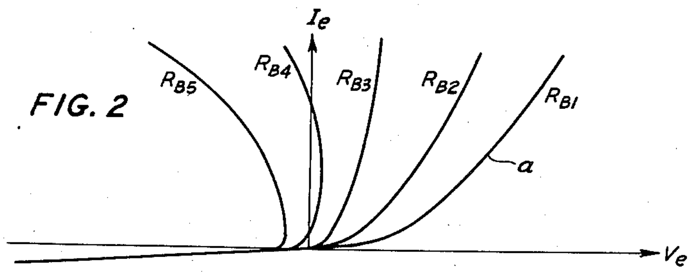
Figure 3:
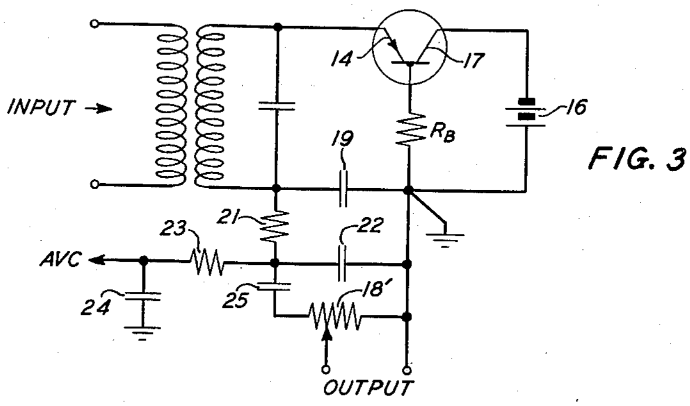
Figure 4:
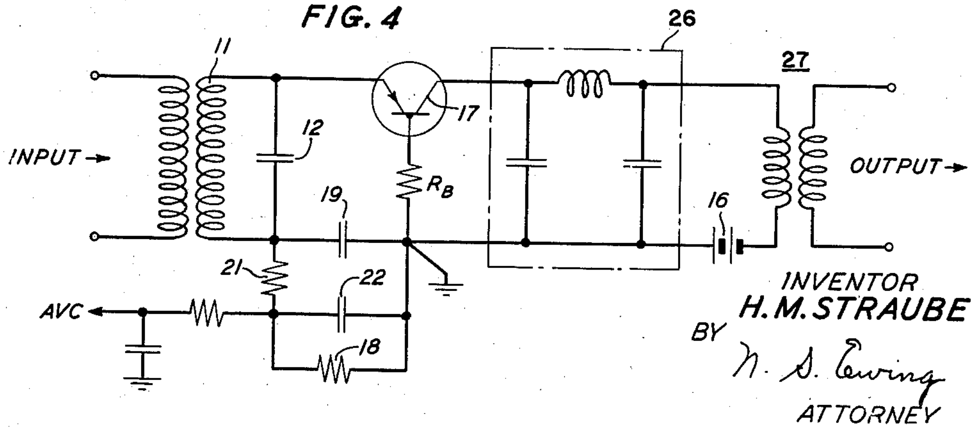

Other features and objects of the invention may be understood from a consideration of the following detailed description when read in accordance with the attached drawings, in which:

Figs. 1, 3, and 4 illustrate various embodiments of a transistor detector employing principles of the invention; and Fig. 2 illustrates input characteristics helpful in understanding the operation of the illustrated circuits.

Modulated signals to be detected are applied to the detector illustrated in Fig. 1 by a transformer 10 having a secondary winding 11 tuned to the carrier frequency by a capacitor 12. These signals are applied to the transistor 13 by an input circuit connected between the emitter electrode 14 and ground 15. Current is supplied to the transistor by a battery 16 connected between the collector electrode 17 and ground. A current limiting resistor in series with the battery 16 is preferably, though not necessarily, omitted for reasons which will become apparent. The detected modulation signals will appear across resistor 18 which is by-passed at the carrier frequency by capacitor 19; this RC combination is essentially in series with the input circuit between emitter and ground.

The input current-voltage characteristic of the circuit thus far described, i. e., from emitter 13 to ground and omitting resistor $R_B$, will resemble curve *a* of Fig. 2. Such a characteristic is obviously not ideal for detection, although sufficiently strong signals could be detected by the Fig. 1 circuit even without resistor $R_B$.

In accordance with the principles of the invention, a highly sensitive detector is obtained by connecting a resistor $R_B$ in series with the base electrode 21. This resistor is common to the emitter-base circuit, including the input transformer 10, and the collector-base circuit, including the battery 16, and resembles the resistor employed in certain transistor trigger circuits to create a negative resistance characteristic over a range of positive input currents. (See, for example, A. J. Rack Patent 2,579,336, dated December 18, 1951.) In the present application, however, this resistor is proportioned to reduce the input resistance $R_{11}$ between emitter and ground to a very small value and not to a large negative value, as in the trigger circuit application. To be more specific, the input resistance $R_{11}$ of a grounded base point contact transistor will lie in the range of 100–500 ohms. With the teaching of the present invention, $R_{11}$ is reduced by a factor of at least 10 to a value approaching zero. An ideal rectifier characteristic, i. e., infinite resistance for negative input signals and zero resistance for positive input signals, may, by this means, be closely approximated.

Fig. 2 illustrates several input characteristics for various values of $R_B$ where $R_{B1}<R_{B2}<R_{B3}<R_{B4}<R_{B5}$. By selecting a value $R_{B3}$, negative input currents, i. e., currents flowing counter-clockwise in the emitter-base current, will "see" a large positive resistance determined primarily by the large reverse resistance of the rectifier-like emitter electrode 14. At a voltage which will be on the order of a few tenths of a volt positive, the characteristic breaks very sharply to a low positive resistance in the order of a few tens of ohms or less so that positive currents will flow in the input circuit substantially unimpeded. This break in the characteristic is quite sharp, and the characteristic for positive currents is quite linear over a reasonable range of currents.

A quantitative appreciation of the effect of $R_B$ may be had from the following expressions. The input resistance $R_{11}$ of a grounded base stage having no external base resistor $R_B$ is given by the following expression:

$$R_{11}=r_e+r_b-\frac{r_b(r_m+r_b)}{r_c+R_L+r_b} \quad (1)$$

where $r_e$, $r_b$, and $r_m$ are the equivalent internal transistor parameters and $R_L$ is an external resistor connected in series with the collector electrode (see "Some Circuit Aspects of the Transistor," by R. M. Ryder and R. J. Kircher, Fig. 7, in the Bell System Technical Journal for July 1949). In the circuit of Fig. 1, $R_L$ equals zero and utilizing the known relation $$\alpha\cong\frac{r_m+r_b}{r_c+r_b} \quad (2)$$

where $\alpha$ is the current amplification factor of the transistor, the above expression may be reduced in approximate form to $$R_{11}\cong r_e-r_b(\alpha-1) \quad (3)$$

If an external resistor $R_B$ is inserted in series with $r_b$, this becomes $$R_{11}=r_e-(r_b+R_B)(\alpha-1) \quad (4)$$

If $\alpha$ is less than one, not only will $R_{11}$ be positive and greater than $r_e$, but also, the addition of $R_b$ will merely increase this value of $R_{11}$. It is, therefore, necessary to use a transistor which has an $\alpha$ greater than one to achieve the low values of $R_{11}$ necessary to realize the improved detector action herein disclosed. At present, most point-contact transistors meet this requirement whereas few, if any, junction transistors do. Point-contact units will therefore be necessary in most cases.

In the selection of $R_B$, it is necessary to balance a desire to achieve maximum sensitivity with the necessity of maintaining stability. Theoretically at least, $R_{11}$ could be made sufficiently negative to cancel the positive series-resistance component of the input circuit. This would permit maximum current to flow around the input loop and thereby achieve maximum detection efficiency. However, if total cancellation is obtained, the circuit may become self-oscillatory. Thus, in practice, it will be desirable to select a value of $R_B$ which will produce feedback short of that required for instability by a reasonable safety factor. In many applications good engineering practice will suggest a value of $R_{11}$ which is only slightly negative or slightly positive, i. e., substantially zero.

Expressed mathematically, the instability threshold would occur when $$R_G+R_{11}=0 \quad (5)$$

where $R_G$ is the series-resistance component of the input circuit, i. e., all input loop resistance other than that included in $R_{11}$.

Substituting for $R_{11}$ from Equation 4

$$R_G+r_e-(\alpha-1)(r_b+R_b)=0 \quad (6)$$

Therefore, solving for $R_B$, $$R_B=\frac{R_G+r_e-(\alpha-1)r_b}{\alpha-1} \quad (7)$$

Assuming a reasonable safety factor $n$, a good engineering value for $R_B$ would be $$R_B=\frac{1}{n}\left(\frac{R_G+r_e-(\alpha-1)r_b}{\alpha-1}\right) \quad (8)$$

Input source loading may be reduced by increasing the value of resistor 18, although, with a fixed $R_B$, this would also reduce sensitivity.

The embodiment illustrated in Fig. 3 is similar to that shown in Fig. 1 but includes a radio-frequency filter comprising resistor 21 and capacitor 22 in the input circuit from which the modulation signals may be derived. This embodiment also includes a resistor 23 and capacitor 24 for deriving an AVC signal. Capacitor 25 blocks direct current from the output.

The modification illustrated in Fig. 4 permits power as well as current gain to be obtained. In this circuit, output is taken from the collector 17 with a low-pass filter 26 interposed between the collector 17 and the output transformer 27 from which the modulation signals are taken. Provision is again made for deriving an AVC signal from the R.-F. filter in the input circuit. If frequency discrimination is not required, the tuning capacitor 12 may be omitted, which in turn permits the RC network 18—19, 21—22 to be dispensed with, assuming provision for AVC is not necessary. As before, if $R_{11}$ is made negative in the interest of increased efficiency, the series-resistance component of the transformer secondary 11 will have to be made positive and greater than the absolute value of $R_{11}$ to maintain stability.

Although a simple resistance $R_B$ has been assumed for the base feedback element in the discussion above, it should be understood that in some cases it may be expedient to associate with or substitute for such a resistor a reactance element, for example, to compensate for stray capacitance at high frequencies, to maintain a sharp break in the characteristic over a broad band, to maintain stability over a broad band, etc. Further embodiments within the scope of the invention will readily occur to one skilled in the art so that the invention should not be deemed limited to the specific illustrative embodiments described.

What is claimed is:

A large-signal detector for modulated carrier waves comprising a transistor having emitter, base, and collector electrodes and a current amplification factor exceeding unity, input circuit means for applying said waves between said emitter and base electrodes, said base and emitter electrodes having a bias potential thereacross of substantially zero volts, output circuit means connected between said collector and base electrodes, said output circuit means comprising filter means for transmitting low frequency modulation signals and attenuating the high frequency carrier, means for regeneratively coupling said collector and emitter electrodes to a degree slightly less than the instability threshold of said transistor comprising an impedance element connected in series with said base electrode and common to a first circuit interconnecting said emitter and base electrodes and a second circuit interconnecting said collector and base electrodes, said first circuit including a capacitor shunted by a resistor.

References Cited in the file of this patent

UNITED STATES PATENTS

| | | |
|---|---|---|
| 1,909,239 | Travis | May 16, 1933 |
| 2,086,465 | Brown | July 6, 1937 |
| 2,517,960 | Barney | Aug. 8, 1950 |
| 2,579,336 | Rack | Dec. 18, 1951 |
| 2,585,078 | Barney | Feb. 12, 1952 |
| 2,594,449 | Kircher | Apr. 29, 1952 |
| 2,595,208 | Bangert | Apr. 29, 1952 |
| 2,622,211 | Trent | Dec. 16, 1952 |
| 2,647,958 | Barney | Aug. 4, 1953 |
| 2,652,460 | Wallace | Sept. 15, 1953 |
| 2,660,624 | Bergson | Nov. 24, 1953 |
| 2,662,976 | Pankove | Dec. 15, 1953 |

OTHER REFERENCES

Radio Amateur's Handbook, pages 145, 146, 1946 edition (copy in Div. 51).